Figure 1:
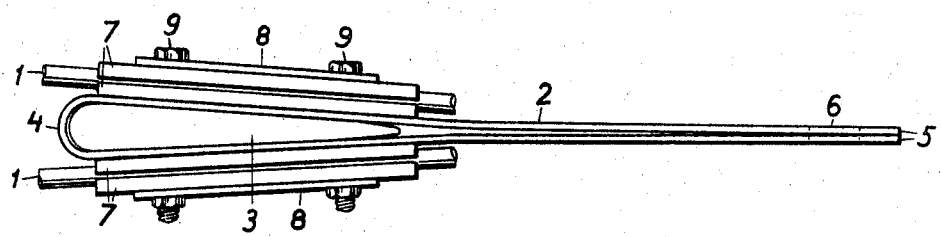

United States Patent [19]
Axelsson et al.

[11] 3,819,287
[45] June 25, 1974

[54] WEDGE-TYPE HOLDING DEVICE

[75] Inventors: Nils Rune Axelsson, Kallhall; Sven Gunnar Wretemark, Stockholm, both of Sweden

[73] Assignee: Telefonaktiebolaget L M Ericsson, Stockholm, Sweden

[22] Filed: Sept. 1, 1972

[21] Appl. No.: 285,754

[30] Foreign Application Priority Data
Sept. 13, 1971  Sweden............................ 11564/71

[52] U.S. Cl................ 403/211, 24/136 R, 339/246, 339/247, 403/391
[51] Int. Cl. ........................................... F16g 11/04
[58] Field of Search .......... 24/126 R, 126 L, 126 C, 24/122.6, 136 R, 136 L, 136 B, 125 R, 135 R, 135 N, 196; 52/230; 287/83, 79; 339/247

[56] References Cited
UNITED STATES PATENTS
2,787,754  4/1957  Sorflaten et al................... 24/125 R
3,148,427  9/1964  Hoffstrom............................ 24/196
3,246,076  4/1966  Stoneburner..................... 24/125 R
3,329,928  7/1967  Broske .............................. 24/136 R
3,531,071  9/1970  Kubli.................................. 24/125 R FOREIGN PATENTS OR APPLICATIONS
1,448,271  6/1966  France............................. 24/125 R Primary Examiner—Bobby R. Gay
Assistant Examiner—Darrell Marquette
Attorney, Agent, or Firm—Hane, Baxley & Spiecens

[57] ABSTRACT

The invention relates to a wedge-type holding device for use in the suspension of an aerial cable with at least two supporting parts. The holding device comprises a cable holder in which a clamp has clamping surfaces diverging in the pulling direction of the aerial cable. Two pairs of jaws are fixed between the clamping surfaces and are adapted for clamping the parts of the aerial cable. A bar, which has a wedge shape diverging in the pulling direction of the aerial cable, is displacably arranged between the pairs of jaws.

4 Claims, 4 Drawing Figures

PATENTED JUN 25 1974　　　　　　　　　　　　3,819,287

WEDGE-TYPE HOLDING DEVICE

The present invention relates to a wedge-type holding device for use in the suspension of an aerial cable with at least two supporting parts. The holding device is particularly suited for aerial cables consisting of four supporting insulated conductors.

It is earlier known that a resistant clamping of an aerial cable to a pole can be achieved by means of a cable holder that comprises a pair of wedge-shape jaws converging in the pulling direction of the aerial cable. For an increase of the pulling force on the clamped conductor parts of the aerial cable or for a progressive compression of the insulation of the conductor parts, the pair of jaws can slide in the direction of the pulling force between converging clamping surfaces of a clamp that is fastened to the pole. The clamp comprises particularly spring-loaded bolts for which holes with oblong cross sections in the pulling direction of the aerial cable are made through the jaws of the cable holder. When the cable holder slides between the converging clamping surfaces of the clamp a parallel displacement between the jaws of the cable holder is avoided because the clamping surfaces of the clamp are provided with cooperating heads and voids respectively.

An example of a wedge-type device which is based on the principle that is indicated above and which is provided with a wedge action against pulling forces in both the directions of a suspended aerial cable, is shown in the Swedish Pat. No. 319.829.

According to the present invention a wedge-type holding device is achieved with a greater clamping force and with a simpler construction than earlier known devices with wedge action. This is made possible when a device according to the invention is constructed as defined in the appended claims.

Figure 2:
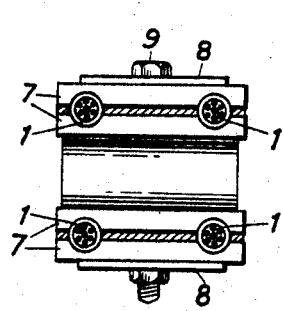
Figure 3:
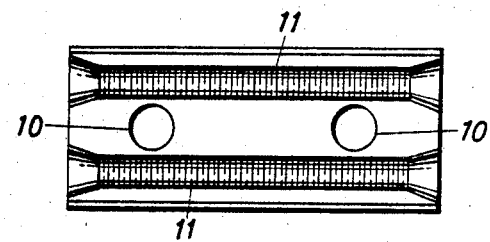
Figure 4:
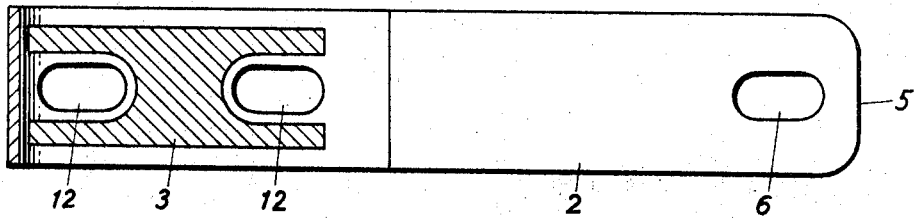

The invention will be described below with reference to the accompanying drawing, in which FIG. 1 in sectional view shows a holding device according to the invention, FIG. 2 shows a front view of the holding device shown in FIG. 1, and FIG. 3 and FIG. 4 show details of the holding device.

FIG. 1 and FIG. 2 show a holding device constructed in accordance with the principle of the invention and adapted for aerial cables consisting of four supporting insulated conductors 1. The holding device comprises a flat bar 2 which is folded over a wedge 3 in order to obtain two opposite plane outer surfaces that diverge towards one end 4 of the holding device. At the ends 5 of the flat bar 2 a through hole 6 is made for fastening the holding device to, for example, a pole by means of a fastener not shown in the drawing. By means of a clamp, consisting of two opposite clamping plates 8 and two bolts 9, two pairs of jaws 7 are clamped against the opposite outer surfaces of the flat bar 2.

The pairs of jaws 7 have identically constructed teeth, the inside of which is shown in FIG. 3. Two circular holes 10 are made for the mentioned bolts 9, the function of which is to clamp the pairs of jaws 7 together as well as to fix them in relation to the clamping plates 8. Two grooves 11 are arranged for the conductors 1 the clamping of which is secured because the grooves 11 are rifled. Preferably an electrically insulating material is used for the pairs of jaws 7, e.g. glass-fibre-reinforced plastic.

In FIG. 4 is shown a section in the centre plane of the flat bar 2 and the wedge 3. It appears from this FIGURE that apart from the mentioned holes 6 at the ends 5 the flat bar 2, as well as the wedge 3, has two oblong holes 12 for the mentioned bolts 9.

It will now be appreciated that when the holding device is fastened to a pole the pairs of jaws 7, which are clamped between the clamping plates 8 and between which a parallel displacement is avoided by means of the mentioned bolts 9 and circular holes 10, form a wedge housing surrounding the flat bar 2 that is fastened to the pole by means of the hole 6. The wedge housing can slide in the pulling direction of the conductors 1 along the mentioned diverging outer surfaces of the flat bar, until the wedge force has become so strong that a further sliding is prevented. Accordingly, during a sliding process caused by an increased pulling force on the conductors 1 or by a progressive compression of the insulation of the conductors 1 the clamping force of the holding device is increased or maintained respectively, since the wedge force is directly proportional to the force with which the pairs of jaws 7 clamp the conductors 1 together. The progressive displacement during the sliding process of the pairs of jaws 7 in relation to the flat bar 2 is controlled by the mentioned oblong holes 12 in the flat bar 2 for the bolts.

We claim:

1. A wedge-type holding device for use in suspending cables comprising: a bar member, said bar member at one of its ends being wedge-shaped with a pair of faces diverging in the direction of cable pull, and at the other of its ends being provided with means for attachment to a fixed support, at least one hole, slotted in the direction of cable pull, passing through the wedge-shaped end of said bar member; a first cable holder disposed on one of said diverging faces; a second cable holder disposed on the other of said diverging faces; each of said cable holders having a pair of opposed jaws for gripping a cable, and a hole through each of said cable holders; and bolt means passing through said holes so that the jaws of said cable holders can bite a cable and said cable holders can slidably ride in unison over their respective associated diverging faces of said bar member in the direction of cable pull.

2. The wedge-type holding device of claim 1 wherein said bar member comprises a wedge and a flat bar folded over said wedge, the ends of said flat bar mutually congruent with a hole passing through said ends.

3. The wedge-type holding device of claim 1 wherein said cable holder is made of an electrically insulative material.

4. The wedge-type holding device of claim 1 wherein the opposed surfaces of said jaws are rifled.

* * * * *